US005608475A

United States Patent [19]

Inoue

[11] Patent Number: 5,608,475
[45] Date of Patent: *Mar. 4, 1997

[54] CAMERA WITH DEVICE FOR IDENTIFYING USED FILM MAGAZINE

[75] Inventor: Hideya Inoue, Yokohama, Japan

[73] Assignee: Nikon Corporation, Tokyo, Japan

[ * ] Notice: The term of this patent shall not extend beyond the expiration date of Pat. No. 5,159,365.

[21] Appl. No.: 451,048

[22] Filed: May 25, 1995

Related U.S. Application Data

[62] Division of Ser. No. 351,145, Nov. 30, 1994, abandoned, which is a continuation of Ser. No. 247,392, May 23, 1994, abandoned, which is a continuation of Ser. No. 141,694, Oct. 26, 1993, abandoned, which is a continuation of Ser. No. 961,345, Oct. 15, 1992, abandoned, which is a division of Ser. No. 747,458, Aug. 12, 1991, Pat. No. 5,159,365, which is a continuation of Ser. No. 465,310, Jan. 12, 1990, abandoned, which is a continuation of Ser. No. 321,793, Mar. 10, 1989, abandoned.

[30] Foreign Application Priority Data

Mar. 15, 1988 [JP] Japan ................................. 63-60916

[51] Int. Cl.$^6$ ............................................... G03B 7/00
[52] U.S. Cl. .................................. 396/207; 396/319
[58] Field of Search ........................... 354/21, 105, 106, 354/173.1, 275

[56] References Cited

U.S. PATENT DOCUMENTS

| | | | |
|---|---|---|---|
| 4,311,377 | 1/1982 | Matteson | 354/217 |
| 4,324,469 | 4/1984 | Harvey | 354/214 |
| 4,443,077 | 4/1984 | Tanikawa | 354/275 |
| 4,678,299 | 7/1987 | Harvey | 354/21 |
| 4,678,300 | 7/1987 | Beach | 354/21 |
| 4,864,332 | 9/1989 | Harvey | 354/21 |
| 4,878,075 | 10/1989 | Cannon | 354/173.1 |
| 4,977,419 | 12/1990 | Wash et al. | 354/76 |
| 4,980,709 | 12/1990 | Cocca | 354/173.1 |
| 4,994,833 | 2/1991 | Cocca | 354/207 |
| 5,032,854 | 7/1991 | Smart et al. | 354/21 |
| 5,159,365 | 10/1992 | Takahasi et al. | 354/21 |

FOREIGN PATENT DOCUMENTS

| | | |
|---|---|---|
| 61232433 | 10/1966 | Japan . |
| 54-26721 | 2/1979 | Japan . |
| 54-164122 | 12/1979 | Japan . |

*Primary Examiner*—David M. Gray
*Attorney, Agent, or Firm*—Shapiro and Shapiro

[57] ABSTRACT

A camera capable of automatic film rewinding into the magazine, comprises an information recording device for recording at least information on use in an information recording portion formed at a predetermined position of the magazine loaded in the magazine chamber of the camera, an information detecting device capable of detecting recorded information of the magazine when it is loaded, a prohibition device for prohibiting the photographing operation in response to a detection signal corresponding to information, indicating that all the film is already used, detected by the information detecting device and a control device for controlling the information recording device, information detecting device and prohibition device in such a manner that the detection by the information detecting device is conducted prior to the recording of information of use by the information recording means, and that the photographing operation is prohibited in response to the detection of information indicating that all the film is already used.

91 Claims, 11 Drawing Sheets

| FIG. 17A |
| FIG. 17B |
| FIG. 17C |

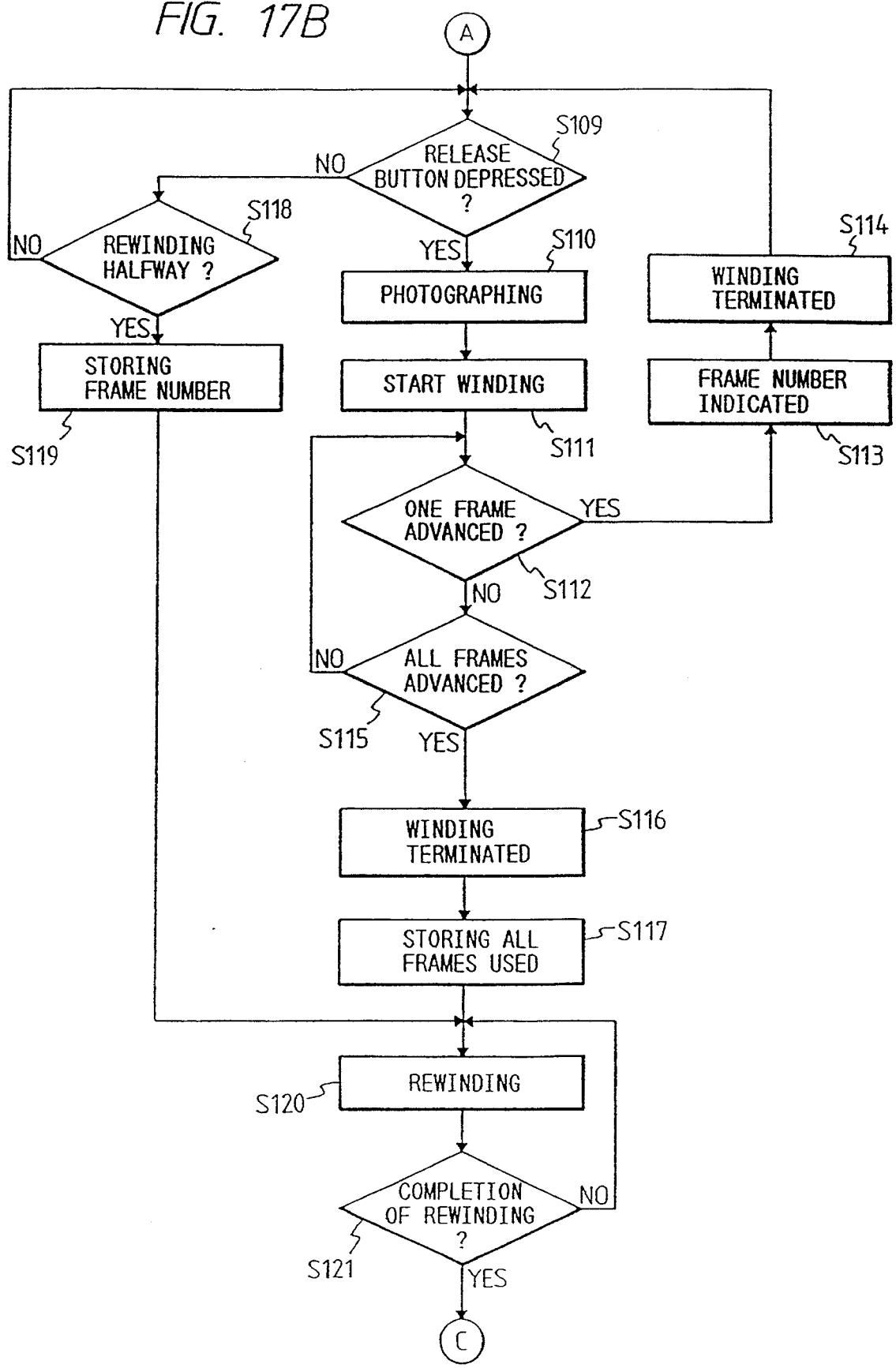

CAMERA WITH DEVICE FOR IDENTIFYING USED FILM MAGAZINE

This is a division of application Ser. No. 08/351,145, filed Nov. 30, 1994 (abandoned), which is a continuation of application Ser. No. 08/247,392, filed May 23, 1994 (abandoned), which is a continuation of application Ser. No. 08/141,694, filed Oct. 26, 1993 (abandoned), which is a continuation of application Ser. No. 07/961,345, filed Oct. 15, 1992 (abandoned), which is a division of application Ser. No. 07/747,458, filed Aug. 12, 1991 (now U.S. Pat. No. 5,159,365, issued Oct. 27, 1992), which is a continuation of application Ser. No. 07/465,310, filed Jan. 12, 1990 (abandoned), which is a continuation of application Ser. No. 07/321,793, filed Mar. 10, 1989 (abandoned).

BACKGROUND OF THE INVENTION

1. Field of the Invention

The present invention relates to a camera utilizing a film magazine, and more particularly to a camera provided with a device for identifying whether the loaded film magazine is already used or not yet used.

2. Related Background Art

In a camera utilizing a film magazine, and in rewinding the photographic film after picture taking, there may result light leak from the film slot of the magazine if the leader portion of the film (or leading end portion thereof) is rewound into the magazine. For this reason there is already known a camera with an automatic rewinding stopping device for terminating the rewinding operation without complete rewinding of the leading end portion of the film into the magazine, as disclosed in the Japanese Laid-Open Patent Application No. 54-164122, or a camera with an automatic rewinding stopping device capable of selecting whether or not to rewind said leader portion into the magazine as disclosed in the Japanese Laid-Open Patent Application No. 61-232433.

However, a magazine, which is subjected to rewinding operation in the rewinding device of a camera as explained above with the leader portion remaining outside the magazine, is difficult to identify as to whether it is already used or not yet used, so that a used magazine may be loaded again in the camera and used anew in the photograph taking. U.S. Pat. No. 4,678,300 discloses attaching a mark to the magazine, indicating that said magazine is already used, but the user may load such magazine again into the camera for photograph taking, overlooking the presence of said mark. In U.S. Pat. No. 4,678,300, the mark is attached to the magazine when the rear cover of the camera is closed. Thus, if the magazine is unloaded from the camera without exposure of all or a portion of the film, the mark will nevertheless indicate that the magazine is already used.

SUMMARY OF THE INVENTION

In consideration of the foregoing, an object of the present invention is to provide a camera with rewinding function for the photographic film into a magazine, capable of discriminating in loading a magazine in the camera whether the magazine is already used or not yet used, and, in case of an unused magazine, recording information of use in a predetermined position of the magazine when it is taken out from the camera, and prohibiting the photographing operation if all the film is already used.

The above-mentioned object can be attained according to the present invention by a camera capable of automatic film rewinding into the magazine, comprising information recording means for recording at least information on use in an information recording portion formed at a predetermined position of the magazine loaded in the magazine chamber of the camera; information detecting means capable of detecting recorded information of the magazine when it is loaded; prohibition means for prohibiting the photographing operation in response to a detection signal corresponding to information, indicating that all the film is already used, detected by the information detecting means; and control means for controlling said information recording means, information detecting means and prohibition means in such a manner that the detection by the information detecting means is conducted prior to the recording of information of use by the information recording means, and that the photographing operation is prohibited in response to the detection of information indicating that all the film is already used.

Also, in accordance with the invention, a camera capable of arbitrary rewinding operation, characterized in that, under the control of the control means, the information recording means records the number of frames at the rewinding in a predetermined position of the magazine in response to the actuation of a rewinding member, that the film is automatically wound to a frame next to said frame number when said magazine is re-loaded, and that the information of use is recorded when all the frames of the film are wound.

According to the present invention, the information of use is recorded on the magazine of which all the frames of the film are already used, before it is taken out of the camera, and the photographing operation is prohibited if the information detecting means detects the information of use on the magazine loaded in the camera. Consequently the magazine with the leader portion of the film remaining outside can be identified as to whether it is already used or not, and the danger of doubled use can be avoided.

The foregoing and other objects of the present invention, and the advantages thereof, will become fully evident from the following description to be taken in conjunction with the attached drawings.

BRIEF DESCRIPTION OF THE DRAWINGS

FIGS. 17 and 17A–17C are a flow chart showing the function of the third embodiment.

DESCRIPTION OF THE PREFERRED EMBODIMENTS

Now the present invention will be clarified in detail by embodiments thereof shown in the attached drawings.

Figure 1:
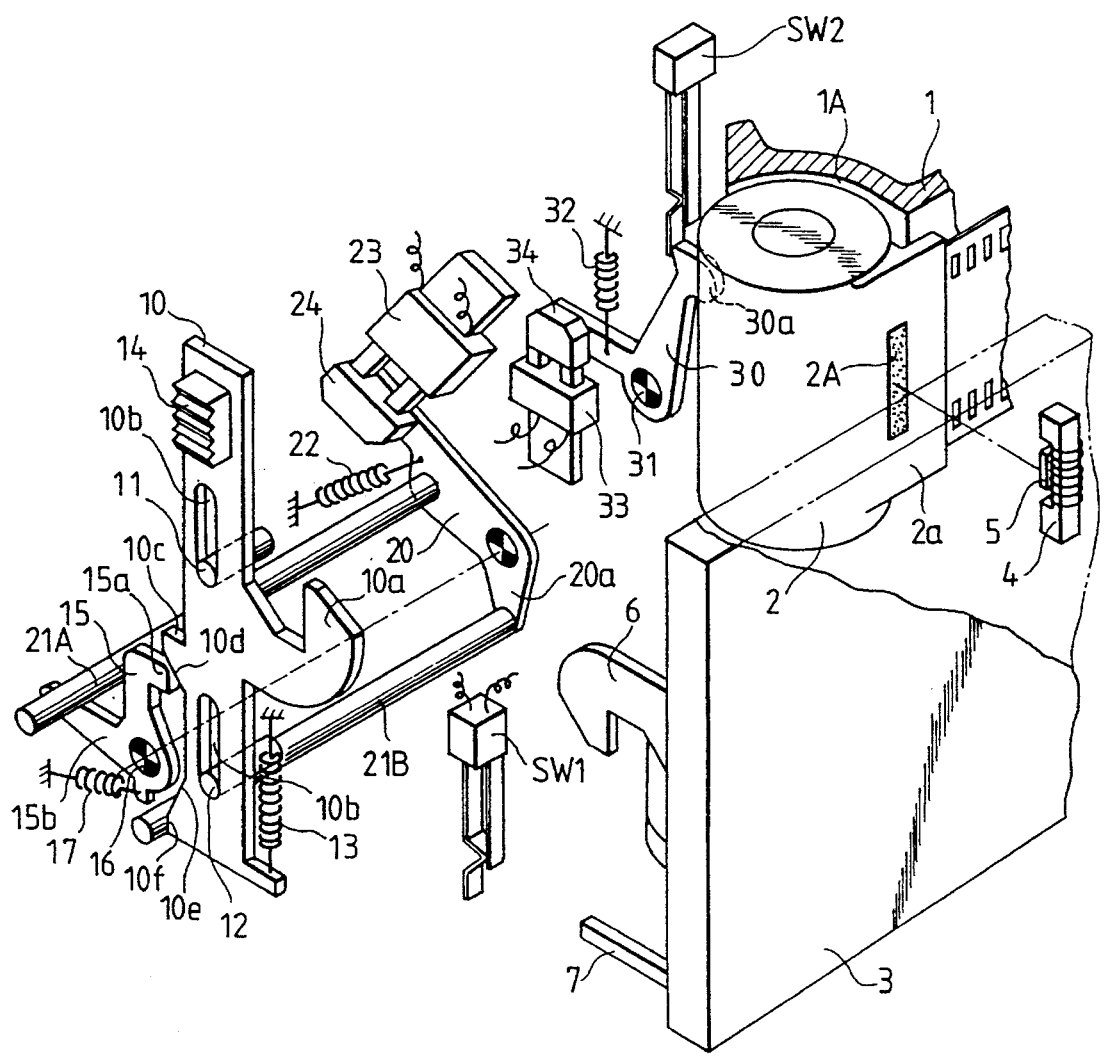
FIG. 1 is a perspective view of a first embodiment of the present invention.
Figure 2:
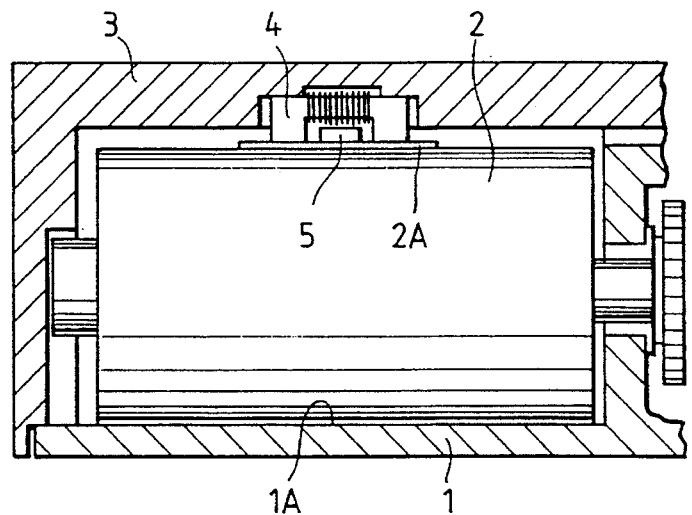
FIG. 2 is a cross sectional view of a magazine chamber constituting a main part of the present invention.

FIG. 1 is a schematic perspective view of a first embodiment of the present invention, and FIG. 2 is a cross sectional view of the principal part of a magazine chamber of said embodiment, with the rear cover closed.

Referring to FIG. 1, a magazine 2 loaded in a magazine chamber 1A of the camera body 1 is provided, on a face 2a behind the film slot (lip), with an information recording portion 2A to be magnetized by magnetic induction. On the rear face of a rear cover 3, opposed to said information recording portion 2A, there are provided, as shown in FIG. 2, an electromagnet 4 for magnetization and a magnetic detecting element 5 such as a Hall effect device in mutually close relationship, and said electromagnet 4 constitutes information recording means.

The rear cover 3 is supported by the camera body 1 by means of a hinge (not shown), and a locking hook 6 and a pin 7 for actuating a normally closed rear cover switch Sw1 fixed on the camera body 1 protrude from the internal face of the rear cover 3, at an end thereof. Said rear cover switch Sw1 is opened by said pin 7, when the rear cover 3 is closed, to produce a rear cover signal.

A lock member 10, having a hook 10a capable of engaging the rear cover hook 6 when the rear cover 3 is closed, is provided with a pair of straight grooves 10b respectively engaging with pins 11, 12 fixed on the camera body 1, whereby said lock member 10 is rendered slidable between an upper position in which the hook 10a engages with the rear cover hook 6, and a lower position in which said hooks are disengaged. Said lock member 10 is constantly biased upwards (as shown in FIG. 1), by a tension spring 13.

Said lock member 10 is further provided with a finger button 14 for lowering the lock member 10 against the biasing force of the tension spring 13, and is further provided, on a lateral face thereof, with a shoulder portion 10c and a slope portion 10d for engaging with a lever 15 to be explained later, and a slope portion 10e and a flat portion 10f for engaging with a second engaging pin 21B to be explained later.

An engaging lever 15, for maintaining the lock member 10 in the lowered position against the biasing force of the tension spring 13 thereby prohibiting the locking of the rear cover 3, is rotatably supported by a shaft 16 fixed on the camera body 1 and is clockwise biased by a tension coil spring 17. Said lever 15 is provided with a hook 15a for engaging with the shoulder 10c of the lock member 10 and an arm 15b, capable of engaging with a first engaging pin 21A fixed on a release lever 20.

The release lever 20 for releasing the engagement of the engaging lever 15 is rotatably supported also by the shaft 16 supporting said engaging lever 15, and is biased anticlockwise by a tension coil spring 22. Said release lever 20 is rotatable between an anticlockwise rotated first position in which the engagement of the engaging lever 15 is released by the contact of the first engaging pin 21A with the arm 15b of the engaging lever 15, and a clockwise rotated second position in which the first engaging pin 21A is separated from the arm 15b. A second engaging pin 21B, fixed at the lower end 20a of the release lever 20, can engage with the slope portion 10e and the flat portion 10f of the lock member 10 at the movement thereof from the lower position to the upper position by the biasing force of the tension spring 13.

At the upper end of the release lever 20, there is provided an armature 24 to be attracted by a first combination magnet 23 fixed on the camera body 1. Said first combination magnet 23 is a so-called off type magnet which normally attracts the armature 24 by the magnetic force of a permanent magnet, but said magnetic force is cancelled by the energization of a coil by a control circuit 51, in response to a signal from a magazine discriminating circuit 50 (FIG. 3) including a magnetic detecting element 5, said signal indicating the absence of magnetization in the information recording portion of the magazine 2. The biasing force of the tension coil spring 22 for the release lever 20 is stronger than that of the tension coil spring 17 for the engaging lever 15, and that of the tension coil spring 13 for the lock member 10 is even stronger than that of said spring 22.

A pressing lever 30, provided at an end thereof with a pressing portion 30a protruding in the magazine chamber 1A of the camera body 1, is rotatably supported by a shaft 31 fixed on the camera body 1, and is constantly biased clockwise by a strong tension coil spring 32 whereby the pressing portion 30a protrudes into the magazine chamber when the magazine is not loaded therein. A magazine switch Sw2 fixed on the camera body 1 is opened by the displacement of the pressing portion 30a by the loading of the magazine 2 against the biasing force of the tension spring 32, thereby releasing a magazine loading signal. At the other end of the pressing lever 30 there is provided an armature 34 to be attracted by an off-type second combination magnet 33, which is fixed on the camera body and is turned off thereby terminating the attraction of the armature 34, when the magnetic detecting element 5 detects an already magnetized recording portion 2A, or a used magazine.

Figure 3:
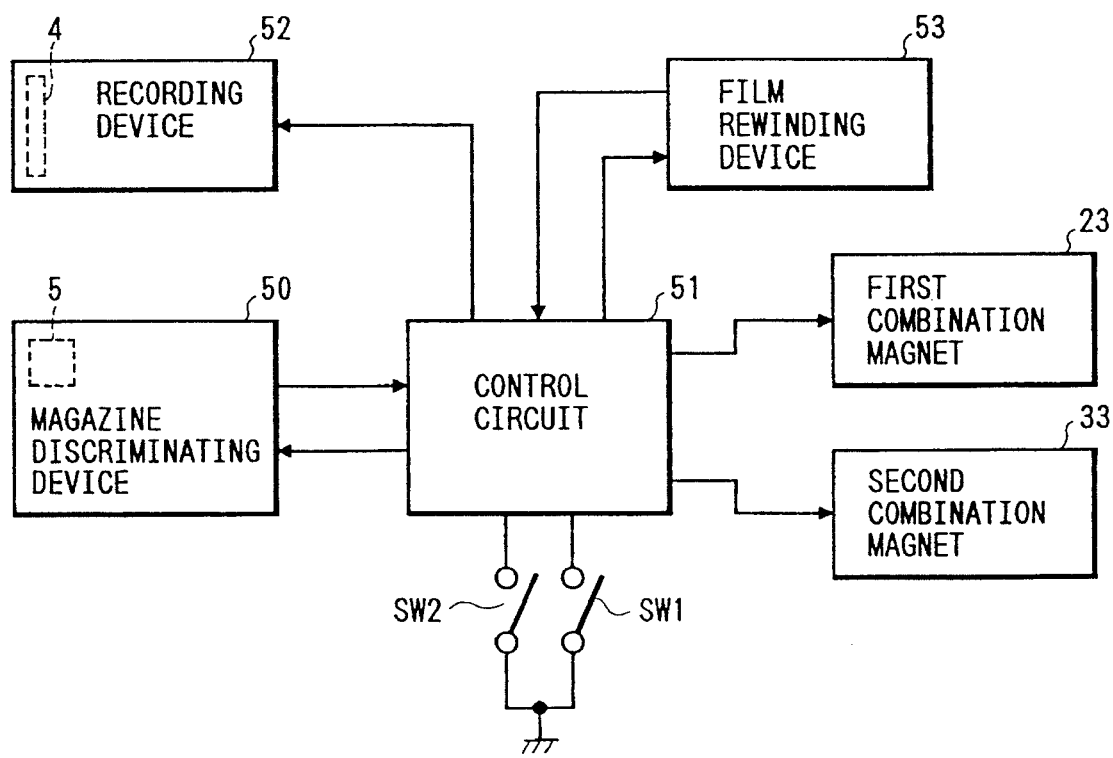
FIG. 3 is a block diagram of electric circuits of the embodiment shown in FIG. 1.

FIG. 3 is a block diagram showing electric circuits of the first embodiment explained above. A film rewinding unit 53 is provided with a known film end detecting device (not shown), and sends a completion signal to a control circuit 51 when the rewinding operation is completed except the leader portion of the film.

Figure 4:
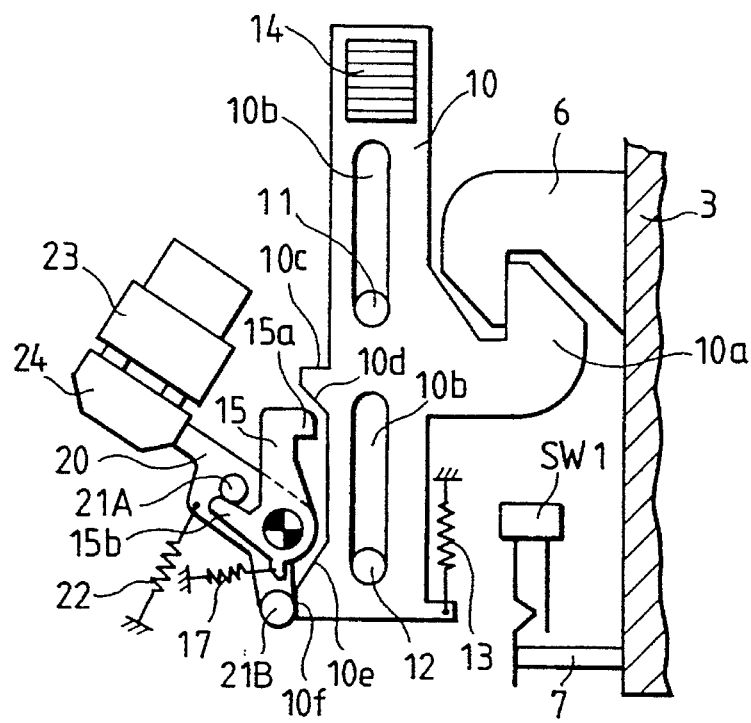
FIGS. 4 and 5 are plan views showing the function of a rear cover lock shown in FIG. 1, respectively showing a locked state and an unlocked state of the rear cover.
Figure 5:
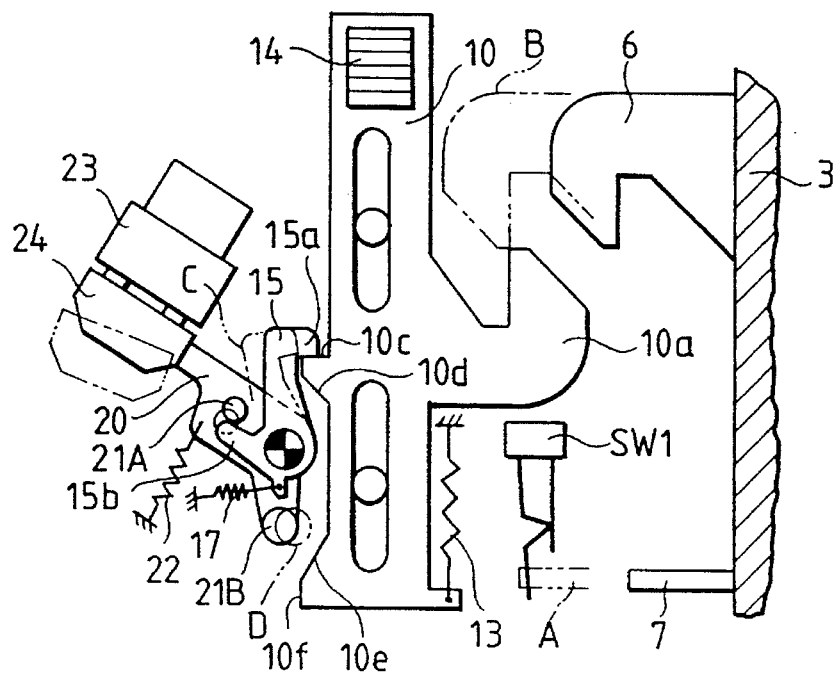

FIGS. 4 and 5 illustrate the function of the rear cover lock, respectively in a locked state and an unlocked state. In the following there will be explained the function of the above-explained embodiment, with reference to FIGS. 3 to 5.

FIG. 4 shows a state immediately after the film rewinding, wherein the lock member 10 is in the upper position, and the rear cover hook 6 engages with the hook 10a of the lock member 10. The rear cover switch Sw1 is maintained open by the pin 7 of the rear cover 3, whereby a rear cover signal, indicating the closed state of the rear cover 3, is sent to the control circuit 51 shown in FIG. 3. Also the second engaging pin 21B of the release lever 20 engages with the flat portion 10f of the lock member 10, and the armature 24 on the release lever 20 is attracted by the first combination magnet 23.

In a state immediately after the rewinding shown in FIG. 4, the magazine switch Sw2 is open because the pressing portion 30a of the pressing lever 30 shown in FIG. 1 is pressed by the magazine 2, whereby a magazine signal, indicating the loaded state of magazine, is sent to the control circuit 51. Also the armature 34 on the pushing lever 30 is attracted by the second combination magnet 33.

By pressing the finger button 14 downwards, the lock member 10 descends against the biasing force of the tension spring 13, whereby the hook 15a of the engaging lever 15 moves on the slope portion 10d of the lock member 10 against the biasing force of the tension spring 17. When the lock member 10 reaches the lower position shown in FIG. 5, the engaging lever 15 rotates clockwise by the biasing force of the tension spring 17, thereby engaging with the shoulder portion 10c of the lock member 10. Consequently, even after the finger is lifted from the button 14, the lock member 10 remains in the lower position. Simultaneously the hook 10a of the lock member is disengaged from the rear cover hook 6, whereby the rear cover 3 is unlocked and can be opened. Also, the flat portion 10f of the lock member 10 moves downwards and is separated, as shown in FIG. 5, from the second engaging pin 21B of the release lever 20. The release lever 20 remains still, however, because the armature 24 is attracted by the first combination magnet 23. When the rear cover 3 is opened, the pin 7 is lifted from the rear cover switch Sw1 to close said switch Sw1, whereby the rear cover signal, indicating the closed state of the rear cover 3, is terminated. In response the control circuit 51 momentarily energizes the second combination magnet 33 thereby releasing the armature 34. Consequently the pushing lever 30 rotates clockwise in FIG. 1 by the biasing force of the tension spring 32, thereby pushing the magazine 2 out and closing the magazine switch Sw2. In response the magazine signal, indicating the loaded state of the magazine, is terminated.

When the magazine is loaded in the magazine and the rear cover 3 is closed, the magazine 2 is pushed by the rear cover 3 and pushes the pressing portion 30a of the pushing lever 30, whereby said lever 30 rotates anticlockwise. At the same time, the electromagnet 4 constituting the recording device 52 and the magnetic detecting element 5 constituting the detecting device 50 are brought into contact with the information recording portion 2a of the magazine 2 as shown in FIG. 2. Also the movement of the pressing portion 30a opens the magazine switch Sw2, thereby sending the magazine signal, indicating the loading of the magazine 2, to the control circuit 51. Also as the result of anticlockwise rotation of the pushing lever 30 against the biasing force of the tension spring 32, the armature 24 is attracted by the permanent magnet of the second combination magnet 33.

Also, when the rear cover 3 is closed, the rear cover hook 6 moves to a position capable of engaging with the hook 10a of the lock member 10, as represented by two-dot chain line B in FIG. 5. The pin 7 moves to a position indicated by a two-dot chain line A in FIG. 5, thus opening the rear cover switch Sw1, and sending a rear cover signal indicating the closed state of the rear cover 3 to the control circuit 51.

In response to the signals from said rear cover switch Sw1 and magazine switch Sw2, the control circuit 51 sends a control signal to a magazine discriminating device 50, whereby the magnetic detecting element 5 discriminates whether the information recording portion 2A is magnetized, namely whether the magazine 2 is used or not, and sends the result of said discrimination to the control circuit 51. In the following there will be explained the function in case the magazine 2 is used or not used.

A. Case of Used Magazine:

(1) If the magnetic detecting element 5 detects that the information recording portion 2A of the magazine is already magnetized, the magazine discriminating circuit 50 sends a used signal to the control circuit 51.

(2) In response, the control circuit 51 momentarily energizes the second combination magnet 33, thereby releasing the armature 34.

(3) Being released from the attracted state, the pushing lever 30 rotates clockwise by the biasing force of the tension spring 32, thereby pushing the magazine 2 toward the rear cover 3.

(4) Since the rear cover 3 is already unlocked, the rear cover automatically opens by the pressure of the magazine 2.

(5) Simultaneous with the opening of the rear cover 3, the magazine 2 is pushed out from the magazine chamber 1A, and the rear cover switch Sw1 and the magazine switch Sw2 are closed.

B. Case of Unused Magazine:

(1) If the magnetic detecting element 5 detects the absence of magnetization in the information recording portion 2A of the magazine 2, the discriminating circuit 50 sends an unused magazine signal to the control circuit 51.

(2) In response the control circuit 51 momentarily energizes the first combination magnet 23.

(3) Thus the first combination magnet 23 is turned off, whereby the armature 24 is released and the release lever 20 rotates anticlockwise to the release position by the biasing force of the tension spring 22.

(4) The rotation of said release lever 20 causes the first engaging pin 21A to press the arm 15b of the engaging lever 15 downwards, whereby the engaging lever 15 rotates anticlockwise, as indicated by a chain line C in FIG. 5, against the biasing force of the tension spring 17.

(5) As the result, the hook 15a of the engaging lever 15 is disengaged from the shoulder 10c of the lock member 10, which is thus released from the engagement in the lower position.

(6) Thus the lock member 10 rises from the lower position shown in FIG. 5 to the upper position shown in FIG. 4, by the biasing force of the tension spring 13.

(7) In the course of ascent of the lock member 10, the slope portion 10e of the lock member 10 comes into contact with and expells the second engaging pin 21B of the release lever 20 which is in the release position indicated by a chain line D in FIG. 5, thereby rotating said release lever 20 clockwise to the position shown in FIG. 4.

(8) Upon ascent of the lock member 10 to the upper position shown in FIG. 4, the pins 11, 12 engage with the lower ends of the straight grooves 10b.

(9) Also the second engaging pin 21B rides on the flat portion 10f of the lock member 10 upon the lock member 10 reaching the upper position, and the release lever 20 causes the armature 24 to be attracted by the first combination magnet 23 and to be maintained in the position shown in FIG. 4.

(10) Also, the ascent of the lock member 10 causes the hook 10a to engage with the rear cover hook 6, whereby the rear cover is locked in the closed position as shown in FIG. 4.

(11) When the film in the magazine 2 is all used for photographing, the control circuit 51 sends a signal to the film rewinding device 53, thereby effecting the film rewinding. Upon completion of said rewinding, the control circuit 51 receives a rewinding completion signal from the film rewinding device 53.

(12) In response, the control circuit 51 sends a signal to the recording device 52, thereby momentarily energizes the electromagnet, thus magnetizing the information recording portion 2A of the magazine 2. In this manner a used signal is recorded in said portion 2A.

(13) When the finger button 14 is pressed downwards to lower the lock member 10 from the upper position in FIG. 4 to the lower position in FIG. 5, the hook 10a is disengaged from the rear cover hook 6 and the rear cover 3 is unlocked.

(14) During the descent of the lock member 10, the slope portion 10d thereof engages with the hook 15a of the engaging lever 15, thereby rotating it anticlockwise against the biasing force of the tension spring 17. When the hook 15a passes the slope portion 10d, said hook 15a engages with the shoulder 10c of the lock member 10, thereby maintaining the lock member 10 in the lower position.

(15) When the rear cover 3 is opened, the rear cover switch Sw1 is closed by the retraction of the pin 7.

(16) In response to the signal from said rear cover switch Sw1, the control circuit 51 momentarily energizes the second combination magnet 33, thereby releasing the armature 34.

(17) In response, the pushing lever 30 rotates clockwise by the biasing force of the tension spring 32, thereby pressing the magazine 2 toward the rear cover 3.

(18) By the pressure of the pressing lever 30, the magazine 2 is pushed out of the magazine chamber 1A, and the rear cover switch Sw1 is simultaneously closed.

The information of use is recorded, in the first embodiment explained above, in relation to the completion of film rewinding, but it can also be effected at the emission of a control signal in the period from the film winding to the completion of film rewinding, for example, at the completion of initial film advancement, completion of film advancement or start of film rewinding. Also the information recording portion 2A is not limited to a magnetic recording medium magnetizable by magnetic induction, but can be a semiconductor memory such as an EPROM.

The foregoing first embodiment constitutes a camera capable of discriminating an unused magazine, in which the information of use is attached to the film magazine by magnetic recording, but it is also possible to record said information by a physical deformation such as scratches, and to detect the presence of such recording. In the following there will be disclosed a camera discriminating an unused film magazine, in which the information of use is recorded by a physical deformation.

Figure 6:
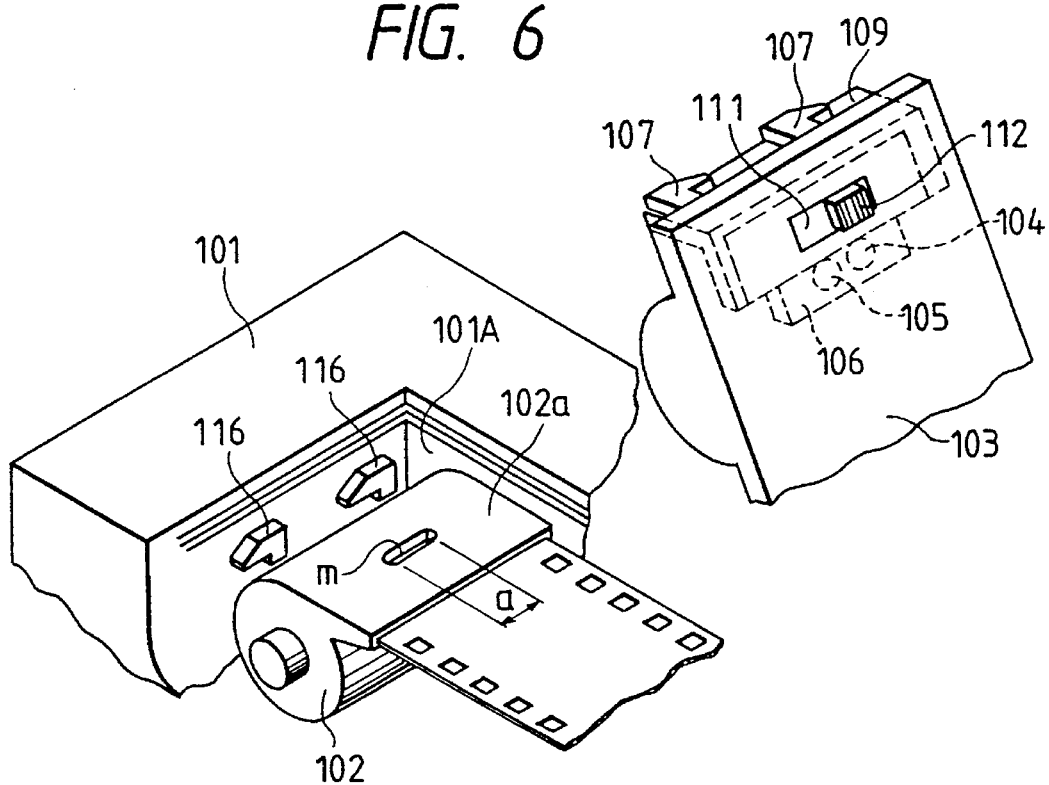
FIG. 6 is a perspective view of a second embodiment of the present invention in which the rear cover is opened.
Figure 7:
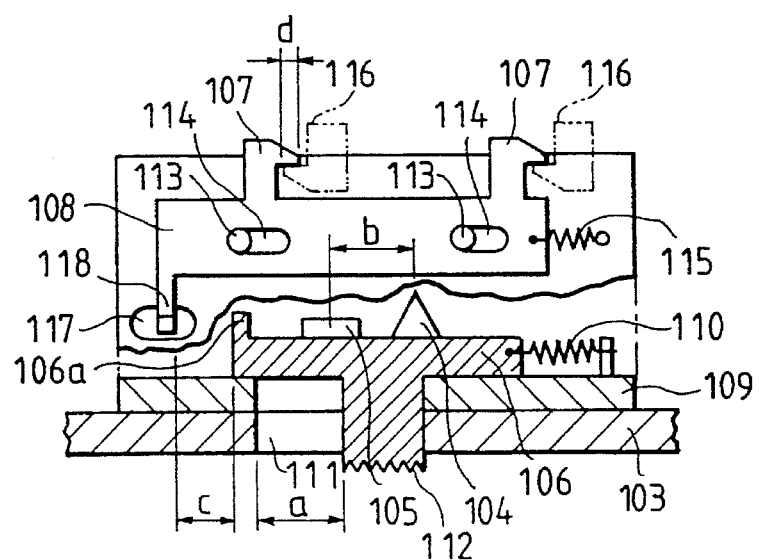
FIG. 7 is a partially cut-off lateral view of a rear cover unlocking mechanism shown in FIG. 6.

FIG. 6 is a perspective view of a camera capable of discriminating an unused film magazine constituting a second embodiment of the present invention, illustrated with the open rear cover, and FIG. 7 is a partially cut-off lateral view of a unit for recording the information of use.

Referring to FIG. 6, a flat portion 102a, behind the film slot of a film magazine 102 loaded in a magazine chamber 101A of the camera body 101, is opposed to a rear cover 103.

The cover is provided with a slidable plate 106 supporting a pressure member 104 with a pointed end for recording the information of use on the magazine 2, and with a detector 105 for thus recorded information. As shown in FIG. 7, said slidable plate 106 supports a locking plate 108 having two rear cover hooks 107, is slidably supported on a support plate 109 fixed on the rear face of the rear cover 103, and is constantly biased toward right by a tension coil spring 110. Said slidable plate 106 is provided with an integral finger button 112, penetrating through an elongated hole 111 formed on the rear cover 103 and the support plate 109.

The locking plate 108 is provided with two guide grooves 114 respectively engaging with two guide pins 113 fixed on the support plate 109, and is biased to right by a tension coil spring 115 in FIG. 7. The rear cover hooks 107 formed on the locking plate 108 are adapted to engage with fixed hooks 116 formed on the camera body 1, when the rear cover 103 is closed. The locking plate 108 is further provided, at the left-hand end in FIG. 7, with an arm 118 passing through a hole 117 formed on the support plate 109 and being adapted to contact with an engaging projection 106a formed at the left-hand end of the slidable plate 106 when it is moved to left in FIG. 7. The amount $\underline{a}$ of leftward movement, in FIG. 7, of the slidable plate 106 is selected larger than the distance $\underline{b}$ between the pressure member 104 and the detector 105, and the distance $\underline{c}$ between the arm 118 of the locking plate 108 and the engaging projection 106a of the slidable plate 106 is selected slightly larger than the amount of engagement $\underline{d}$ of the rear cover hooks 107 and the fixed hooks 116.

Figure 8:
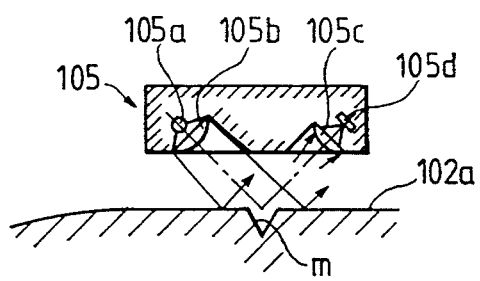
FIG. 8 is a schematic cross-sectional view of an embodiment of the detector.

FIG. 8 schematically shows a photoelectric detector as an example of the detector 105, in which a parallel light beam emitted from a light source 105a through a lens 105b illuminates the flat portion 102a of the film magazine 102, and the reflected light is condensed by a lens 105c and received by a photoelectric converting device 105d such as a CCD for detecting the linear mark m (scratch) recorded by the pressure member 104. When the linear mark m recorded on the flat portion 102a of the magazine 102 is detected by the photoelectric detector 105, a shutter release button 120 provided on the camera body as shown in FIG. 9, is locked by a signal from said detector 105.

Figure 9:
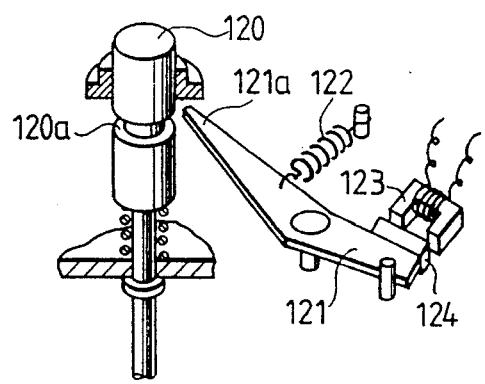
FIG. 9 is a perspective view of an example of a release prohibiting mechanism.

Referring to FIG. 9, a locking lever 121 is constantly biased clockwise by a tension coil spring 122, and is provided, on an end thereof, with an armature 124 to be attracted by a locking magnet 123. When the armature 124 is attracted by the energization of the magnet 123, the locking lever 121 rotates anticlockwise against the biasing force of the tension spring 122 whereby the other end 121a of said lever enters an engaging groove 120a of the shutter release button 120 to prohibit the downward movement thereof.

Figure 10:
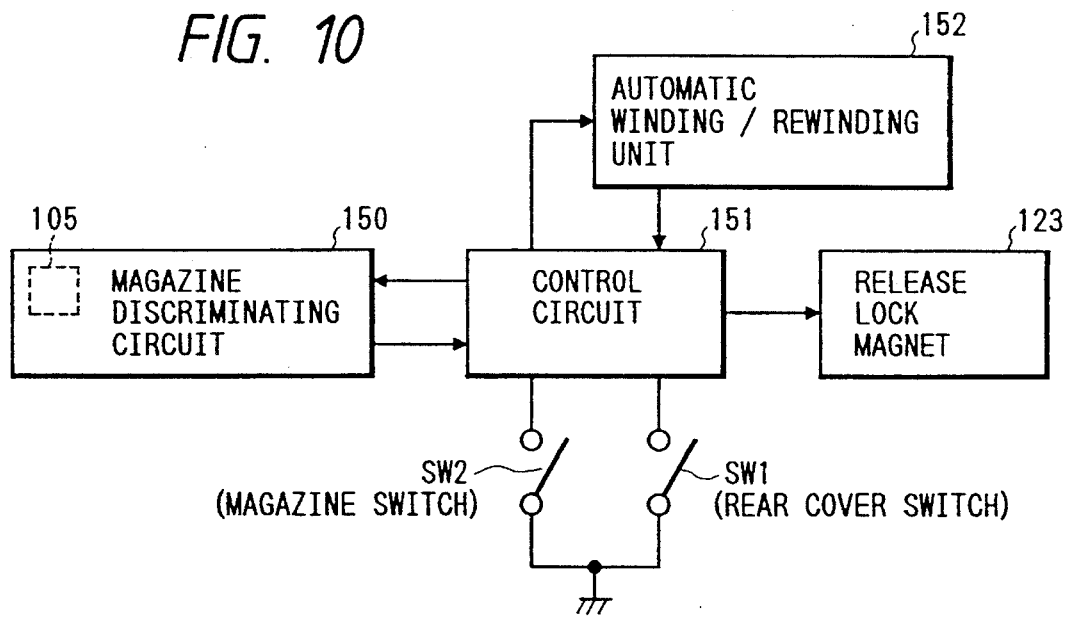
FIG. 10 is a block diagram of electric circuits of the second embodiment shown in FIG. 6.

FIG. 10 is a block diagram of electric circuits of the second embodiment, wherein a rear cover switch Sw1 is a normally closed switch which is opened by the closing of the rear cover 103, as in the first embodiment shown in FIG. 1. A magazine switch Sw2 is also a normally closed switch to be opened by the loading of the magazine 102 in the magazine chamber 101A, as in the first embodiment.

Figure 11:
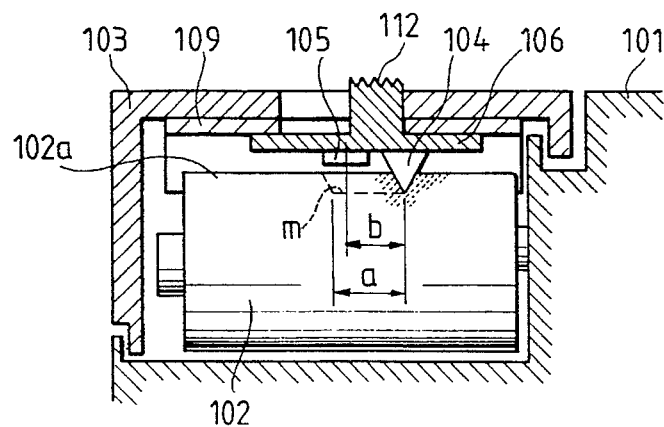
FIG. 11 is a cross sectional view of a magazine chamber, with the closed rear cover, of the embodiment shown in FIG. 6.
Figure 12:
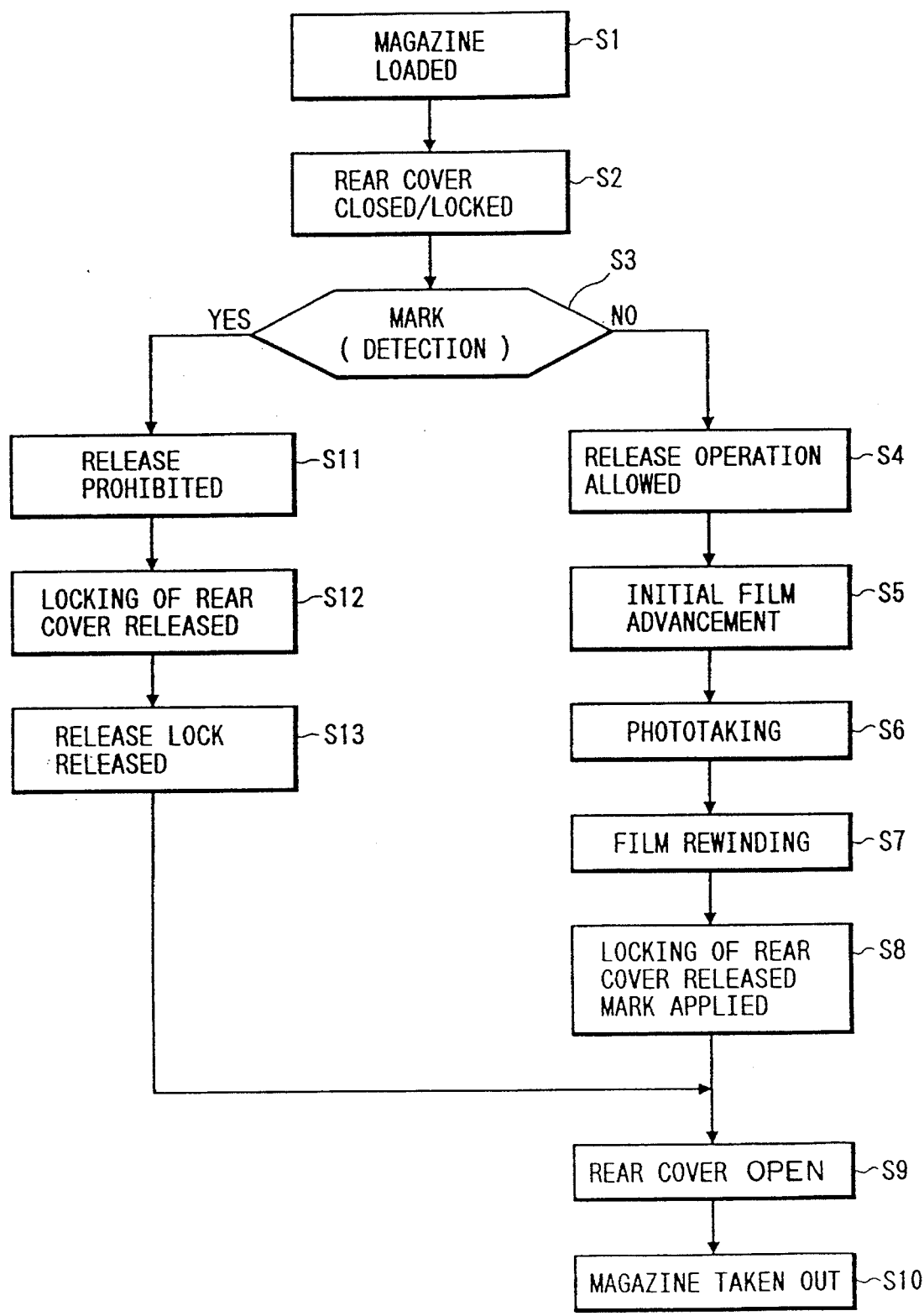
FIG. 12 is a flow chart showing the function of the second embodiment shown in FIG. 6.

FIG. 11 is a cross-sectional view of a state immediately after the loading of the magazine 102 and the closing of the rear cover 103, and FIG. 12 is a flow chart showing the function of the second embodiment. In the following there will be explained the function of the second embodiment shown in FIG. 6, with reference to the flow chart shown in FIG. 12.

When a used or unused magazine 102 is loaded in the magazine chamber 102A of the camera body 101 (step S1), and the rear cover 103 is closed, the slope portions of the rear cover hooks 107 come into contact with the fixed hooks 116 of the camera body 101 whereby the locking plate 108 moves to left in FIG. 7 against the biasing force of the tension spring 115. The rear cover hooks 107 ride on the slope portions of the hooks 116 and are engaged by said hooks, whereby the locking plate 108 moves to right to the original position by the biasing force of the tension spring 115, thus completing the locking (step S2). At the same time the rear cover switch Sw1 and the magazine switch Sw2 are both opened, thus sending a rear cover signal and a magazine signal to a control circuit 151. Also when the rear cover 103 is closed, the pointed end of the pressure member 104 is pressed against the flat portion 102a of the magazine 102, for forming a small scratch, as shown in FIG. 11. However an axially long linear mark m (information of use) as shown in FIG. 6 is not recorded unless the finger latch 112 is moved to left in FIG. 7 to cause leftward movement of the pressure member 104 together with the slidable plate 106 against the biasing force of the tension spring 110.

After the lapse of a predetermined time (required for completion of locking) from the reception of the rear cover signal and the magazine signal from the switches Sw1, Sw2, the control circuit 151 sends an output signal to the magazine discriminating circuit 150, thereby causing the detector 105 to detect the presence of the linear mark m (step S3). The discriminating circuit 150 turns on the light source 105a of the detector 105, thereby illuminating the flat portion 102a with a parallel light beam as shown in FIG. 8. The reflected light is received by the photoelectric converting element 105d such as a CCD, and the presence or absence of the mark m is identified from the output signal thereof and there is identified whether the magazine 102 is used or not.

If the loaded magazine 102 is unused, without the used mark m, the magazine discriminating circuit 150 sends an unused magazine signal to the control circuit 151, which, in response, discriminates whether the shutter release button 120 is locked, namely whether the magnet 123 is energized. In case of locked state, the control circuit 151 terminates the energization of the magnet 123, thereby terminating the locked state and enabling the shutter releasing operation by the button 120 (step S4). A first depression of the release button effects the initial film advancement (step S5), and then the photographing is conducted by each depression of the release button 120 (step S6). When the photographing operations are completed for all the film in the magazine 102, the control circuit 151 sends a rewinding signal to an automatic winding/rewinding unit 152 to rewind all the film except the leader portion thereof (step S7).

After the completion of film rewinding the finger button 112 is moved to left in FIG. 7, whereby the slidable plate 106 moves to left by an amount c against the biasing force of the tension spring 110. Thus the engaging projection 106a of the slidable plate 106 meets the arm 118 of the locking plate 108, and a further movement of the slidable plate 106 by amount d to left (see. FIG. 7) disengages the rear cover hooks 107 from the fixed hooks 116, thus unlocking the rear cover. At the same time the pressure member 104 moves to left by an amount a together with the slidable plate 106 whereby a linear mark (scratch) m of a length a is formed on the flat portion 102a of the magazine 102 (step S8).

By opening the rear cover 103 while the finger button 112 is moved to left by the amount a (unlocked state) (step S9), the magazine 102 bearing the linear mark m can be taken out from the magazine chamber 101A (step S10).

On the other hand, if the step S3 detects the linear mark m, the discriminating circuit 150 sends a used magazine signal to the control circuit 151, which, in response, energizes the locking magnet 123, thereby rotating the locking lever 121 anticlockwise by the attraction of the armature 124 and locking the release button 120 to disable the shutter release operation (step S11). Then the finger button 112 is moved to left, in FIG. 7, as in the step S8, thereby unlocking the rear cover 103 (step S12). In this step S12, however, the pressure member 104 merely moves on the already formed mark m and does not doubly form the linear mark m.

The leftward movement of the finger button 112 in FIG. 11 causes the detector 105, fixed on the slidable plate 106, to move to left by an amount a together with the pressure member 104. Therefore the detector 105 is positioned to the left of the used mark m and does not detect said mark. Consequently the magazine discriminating circuit 150 sends an unused magazine signal to the control circuit 151, which, in response, deactivates the magnet 123, thereby terminating the release locking state (step S13).

Thereafter the sequence proceeds to the step S9 to effect the opening of the rear cover (step S9) and the taking out of the magazine (step S10).

If the finger is lifted from the finger button 112 without opening the rear cover 103 after the step S8, the detector 105 automatically returns, together with the slidable plate 106, to the original position at right (shown in FIG. 11) by the biasing force of the tension spring 110. In such case the already existing used mark m is detected, so that the sequence moves to the step S11 to lock the release button.

The second embodiment explained above can prevent doubled use of the film magazine with a relatively simple structure. However, the used mark m is attached to the magazine even if an unused magazine is loaded, and the rear cover is closed and then opened and said magazine is taken out before the start of the photographing operation. In such case the used mark m can be covered for example with paint.

FIG. 9 shows means for mechanically prohibiting the shutter releasing operation, but it is also possible to provide the control circuit 151 with a circuit for electrically prohibiting the shutter releasing operation, thereby disabling said operation when the shutter release button is depressed.

In the first and second embodiments explained above, when a film magazine is loaded in a camera capable of discriminating the used magazine, the information detecting means detects whether the used mark is present in the predetermined position of the magazine, and, if the used mark is detected, the magazine is taken out and replaced. In case of an unused magazine for which the used mark is not detected, normal photographing operations are conducted, and, after the photographing operations on all the frames, the film is rewound except the leader portion thereof. In this case the information recording means records at least the information of use in said predetermined position of the magazine in a period from the detection by the information detecting means to the opening of the rear cover, thereby enabling discrimination from an unused film magazine.

In case the information of use is recorded by magnetizing a magnetic recording portion of the magazine with an electromagnet, the detector therefor is provided between or in the vicinity of the poles of said electromagnet and effects the detecting operation before the energization of said electromagnet, thus identifying whether the magazine is used or not.

If the information detecting means detects the information of use, prohibiting means disables the locking of the rear cover or the release prohibiting means disables the shutter releasing operation, thereby indicating that the loaded magazine is already used.

In a structure in which information recording means for attaching a linear mark on the magazine and information detecting means for detecting said linear mark are provided on the slidable plate for unlocking the rear cover, said linear mark is attached at the unlocking of the rear cover, and the detection of said mark is effected by the information detecting means in a period from the magazine loading to the start of photographing operation.

Consequently, for a used magazine, the shutter releasing operation is locked in response to the detection of the linear mark. Also in case of an unused magazine, the mark is not detected, so that the shutter releasing operation is enabled. The information recording means can be constructed simply since said linear mark can be mechanically attached by the movement of a pointed pressure member in the axial direction of the magazine.

The foregoing embodiments, shown in FIGS. 1 and 6, are applied to a camera in which the magazine is loaded from a direction perpendicular to the film plane. In the following there will be explained, with reference to FIG. 13, an embodiment of the present invention applied to a so-called drop-in loading camera in which the film magazine is loaded in the axial direction of the rewinding shaft.

Figure 13:
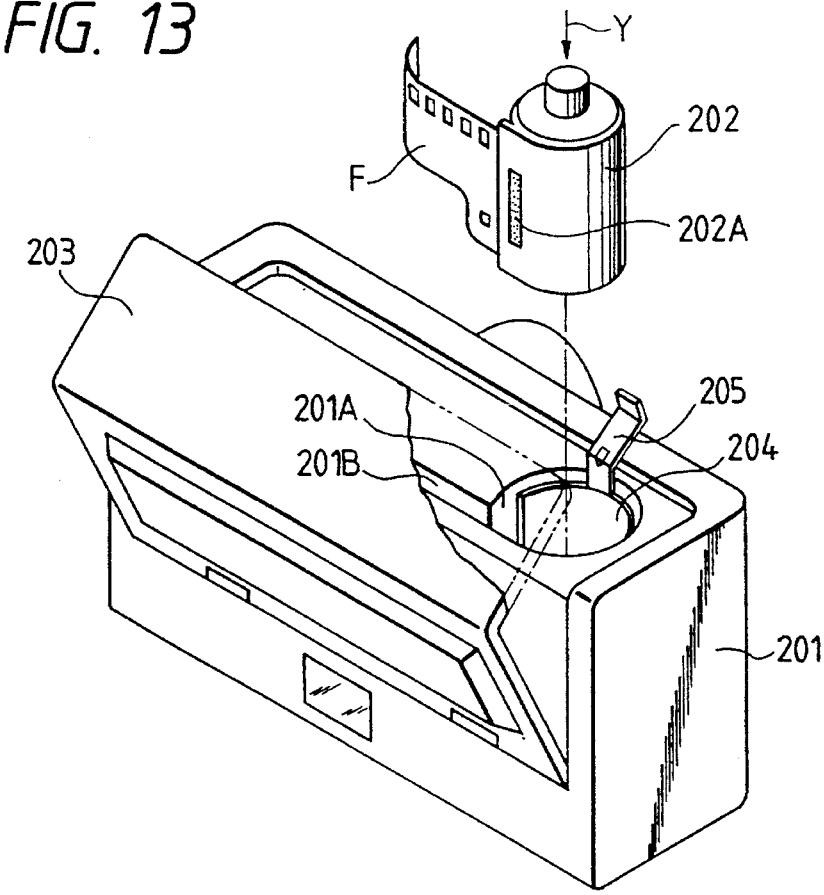
FIG. 13 is a perspective view of a drop-in loading camera, with the open rear cover, constituting a third embodiment of the present invention.
Figure 14:
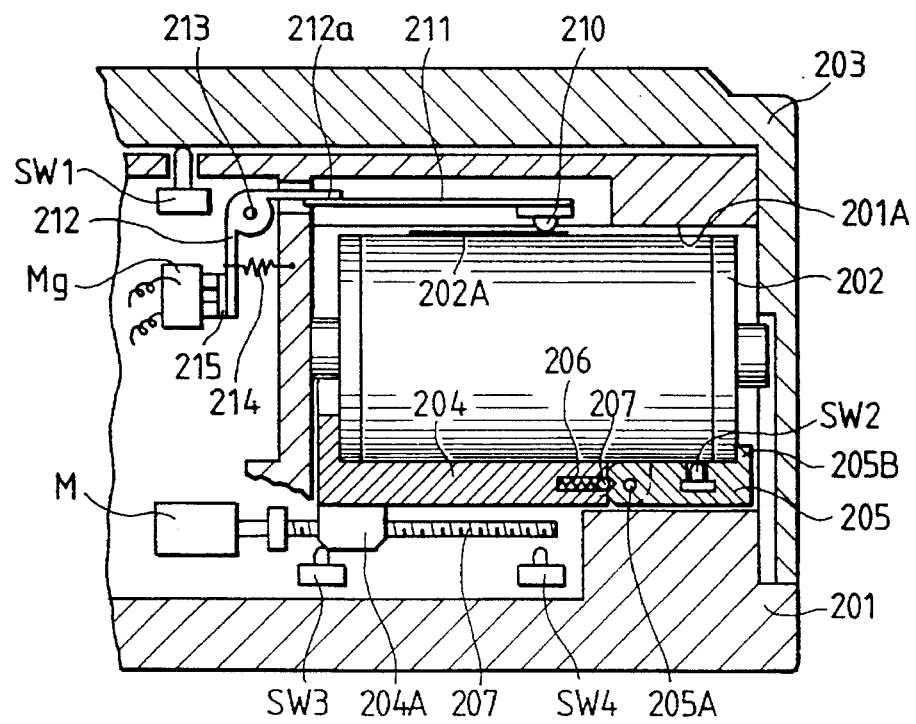
FIG. 14 is a cross sectional view of a magazine chamber of said third embodiment, with the rear cover closed after the loading of the magazine.
Figure 15:
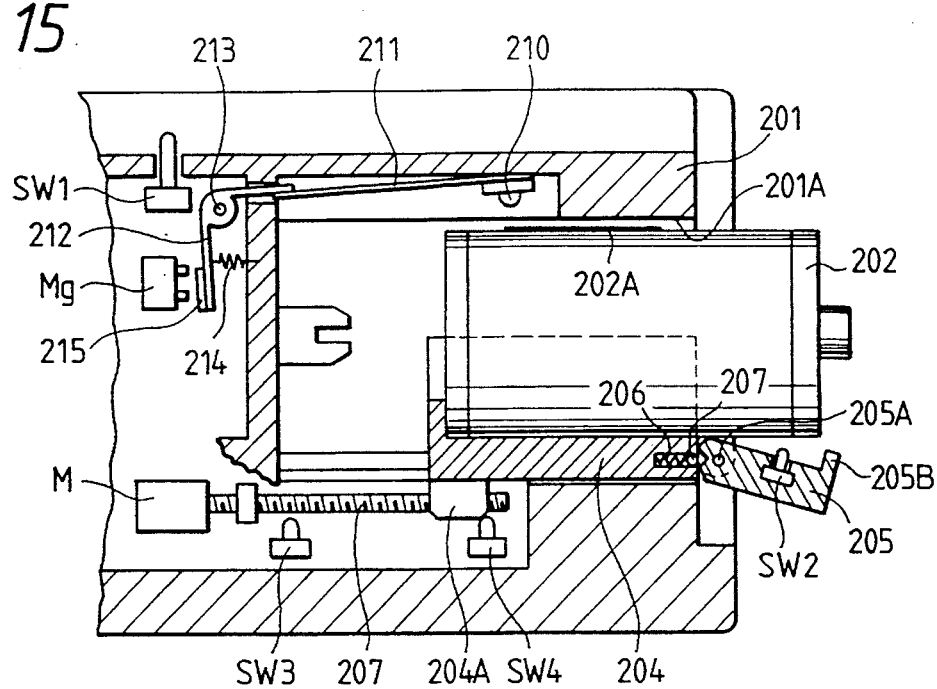
FIG. 15 is a cross-sectional view of said magazine chamber at the removal of the magazine.

FIG. 13 is a perspective view of a third embodiment of the present invention, showing the state of magazine loading into the inverted camera body, FIG. 14 is a cross sectional view of the magazine chamber after the magazine loading and the closing of the rear cover, and FIG. 15 is a cross sectional view of the magazine chamber at the taking out of the magazine.

Referring to FIG. 13, the camera body 201 is provided, at the bottom thereof, with a magazine chamber 201A into which the magazine 202 can be inserted in the axial direction Y, and a slot 201B for inserting the leader portion of the film. The rear cover 203 is so constructed as to cover the bottom also. A rear cover switch Sw1 (cf. FIG. 14) is a normally closed switch which is opened by the closing of the rear cover 203. The magazine 202 is contained, in the magazine chamber 201A, as shown in FIG. 14, by a magazine holder composed of a semicircular holder member 204 axially movable in the chamber and an engaging member 205.

As shown in FIG. 15, the holder member 204 is provided, at an end thereof, with the engaging member rotatable about a pin shaft 205A. When the magazine 202 is inserted into the holder member 204 and the engaging member 205 is rotated anticlockwise in FIG. 15, an end hook portion 205B thereof engages with the right-hand rim of the magazine 202 as shown in FIG. 14. The engaging member 205 is provided with a normally closed magazine switch Sw2, which is opened by engagement with the cylindrical periphery of the magazine 202 when it is engaged by the engaging member 205. At the hinge between the engaging member 205 and the magazine holder 204, there is provided a click device comprising a click spring 206 and a click ball 207, whereby the engaging member 205 can be maintained in the engaging position shown in FIG. 14, when it is rotated anticlockwise from the released position shown in FIG. 15.

The holder member 204 is provided thereunder with a projection 204A engaging with a feed screw 207 driven by a motor M, whereby the holder member 204 can be displaced axially by the rotation of said feed screw 207. Also said projection 204A engages with and opens a first limit switch Sw3 or a second limit switch Sw4, respectively when the holder member 204 moves to the left-end position of the magazine chamber 201A as shown in FIG. 14 or the right-end position as shown in FIG. 15.

The magazine 202 is provided, at the film slot thereof, with an information recording portion 202A magnetizable by magnetic induction, as shown in FIG. 13, and a magnetic head 210 adapted for contacting said information recording portion 202A is supported on an end of a plate spring 211, of which the other end is fixed on an arm 212a of a lever 212. Said lever is rotatably supported by a shaft 213 fixed on the camera body 201, and is constantly biased anticlockwise, so as to separate the magnetic head 210 from the recording portion 202A, by a tension coil spring 214. The other arm of the lever 212 is equipped with an armature 215 to be attractable by an electromagnet Mg against the biasing force of the tension spring 214, whereupon the magnetic head 210 is brought into contact with the magnetic recording portion 202A of the magazine 202 as shown in FIG. 14.

Figure 16:
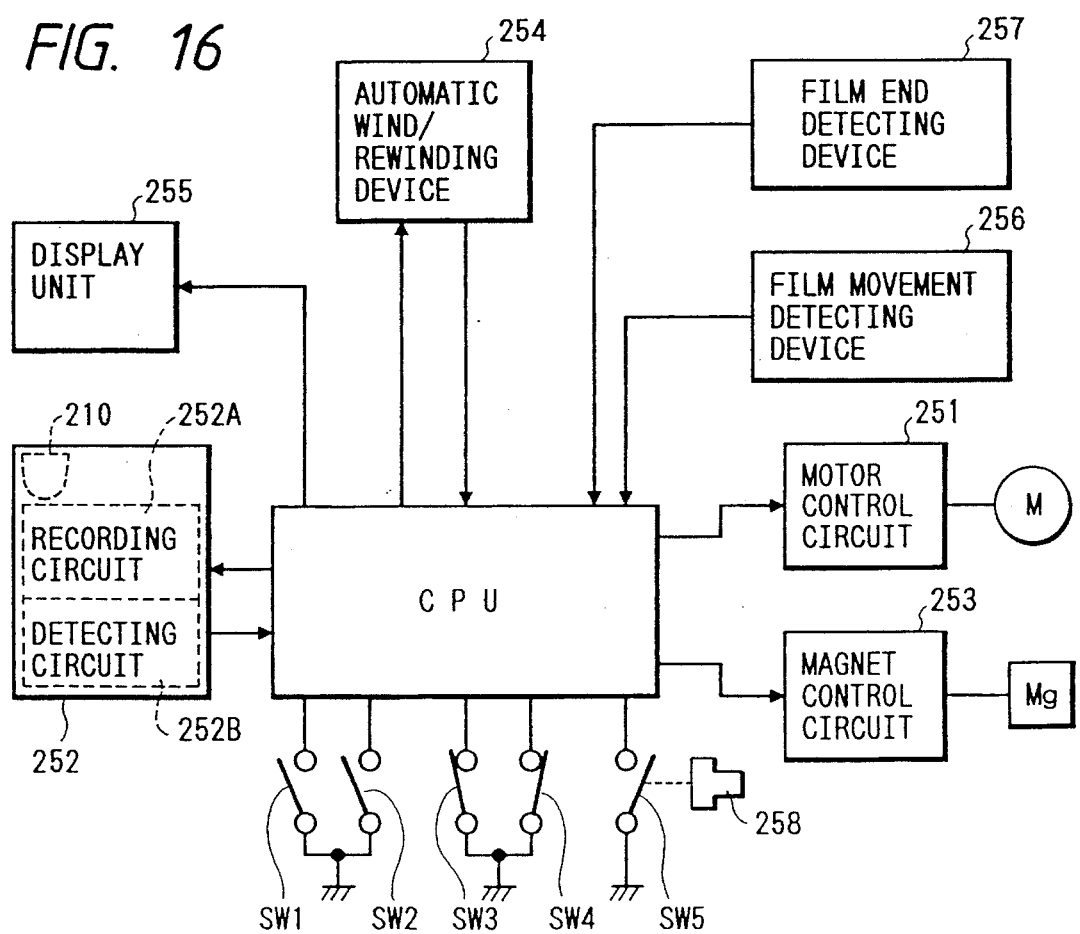
FIG. 16 is a block diagram of electric circuits of the third embodiment shown in FIG. 13.
Figure 17A:
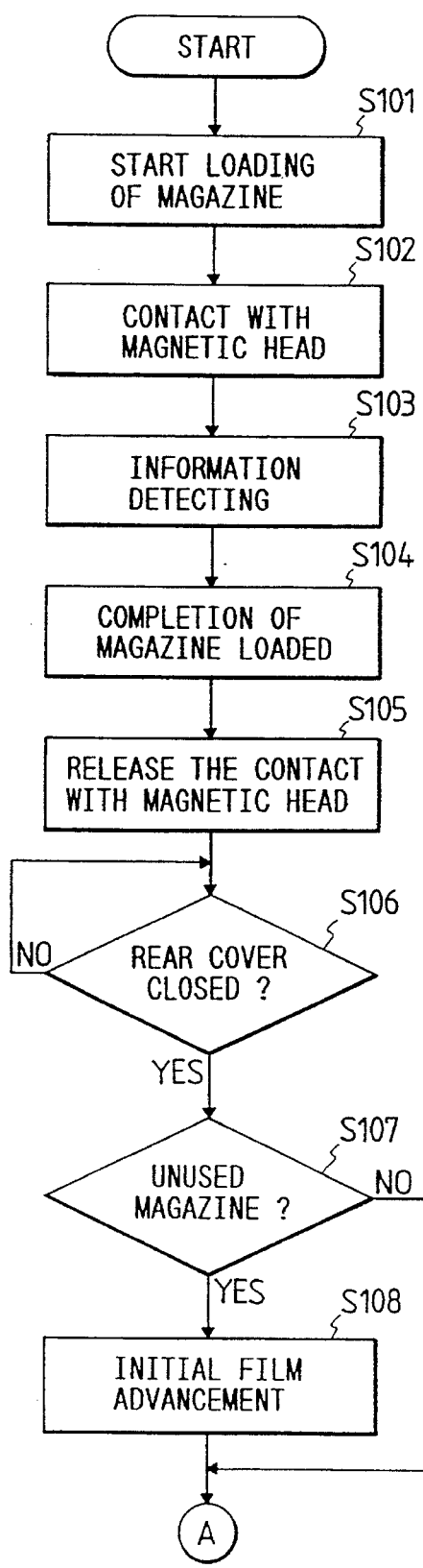
Figure 17:
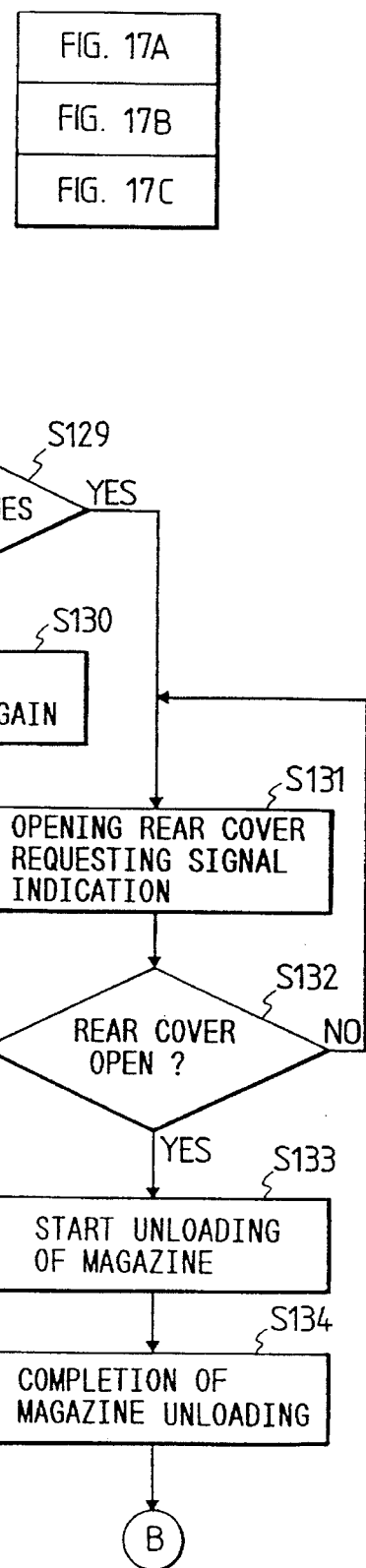
Figure 17C:
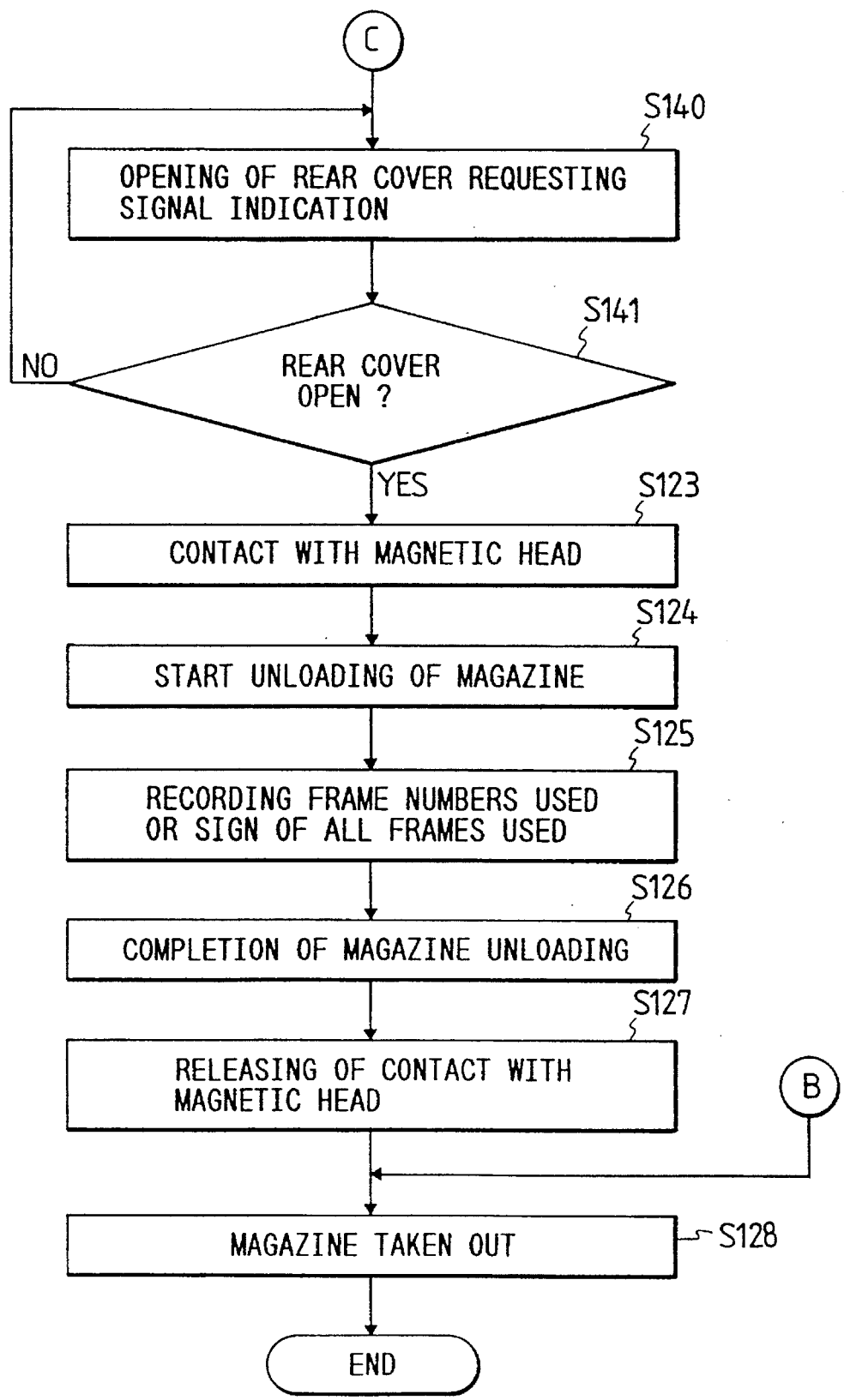

FIG. 16 is a block diagram of electric circuits in the third embodiment, in which a central processing unit CPU controls a motor circuit 251 for controlling the magazine moving motor M, a record detecting unit 252 comprising an information recording circuit 252A and an information detecting circuit 252B, containing the magnetic head 210 in common, a magnet control circuit 253 for controlling the electromagnet Mg for moving the magnetic head 210 etc. The CPU also controls an automatic film wind/rewinding device 254 provided in the camera body 201 and a display device 255 for indicating the frame number etc., and receives signals from a film movement detecting device 256 for detecting the end point of film advancement or rewinding, and a film end detecting device 257. A film rewinding switch Sw5 enables film rewinding even before the completion of photographing on all the film, and is closed by the depression of a rewinding instruction button 258 to enable the film rewinding. The film movement detecting device 256 includes a sprocket wheel (not shown) engaging with the perforations of the film and an unrepresented detector for detecting the rotation of said sprocket wheel, and continues to produce pulse signals during the movement of film but terminates said pulse signals when the film is stopped. Thus, in response to the termination of the pulse signals, the CPU identifies the completion of winding of the entire film and instructs the film rewinding. The film end detecting device 257 is of a known structure having a pin linked with a switch (not shown) and protruding in the film path, and detecting the film end by the protruding pin position in the film path after the passing of the film end. The CPU, in response to a detection signal from said device, terminates the film rewinding operation.

FIGS. 17 and 17A–17C are a flow chart showing the function from the loading of the magazine 202 to the removal thereof. In the following there will be explained the function of the third embodiment explained above, with reference to the flow chart.

When the rear cover 203 is opened as shown in FIG. 13, the rear cover switch Sw1 is closed. The holder member 204 is at the right-end position of the magazine chamber 201A as shown in FIG. 15, and the magazine switch Sw2 is also closed. The first limit switch Sw3 is closed while the second limit switch Sw4 is opened. The electromagnet Mg does not attract the armature 215, so that the magnetic head 210 is in a released position separated from the information recording portion 202A of the magazine 202.

In the above-explained state, the film magazine 202 is inserted into the holder member 204 in the unloading position in the magazine chamber 201A as shown in FIG. 15, and the leader portion F of the film is inserted into the film slot 201B shown in FIG. 13. Then the engaging member 205 is rotated anticlockwise until the hook portion 205B engages with the right-end rim of the magazine 202, thereby fixing the magazine 202 in the holder member 204. At the same time the magazine switch Sw2 is opened in contact with the cylindrical portion of the magazine 202. Also the engaging member 205 is retained by the click device (206, 207) and does not return clockwise.

An opening signal of said magazine switch Sw2 is sent to the CPU shown in FIG. 16, thereby activating the CPU. In response, the CPU immediately sends a control signal to the motor control circuit 251, thereby activating the motor M. The holder member 204 starts to move to left, in FIG. 15, by the rotation of the feed screw 207 driven by the motor M, thus initiating the loading of the magazine 202 (step S101). In response the second limit switch Sw2 is closed, and, in response to a signal thereof, the CPU sends a signal to the magnet control circuit 253, thereby energizing the electromagnet Mg. Thus the armature 215 is attracted by the electromagnet Mg, and the lever 212 rotates clockwise against the biasing force of the tension spring 214, bringing the magnetic head 210 in contact with the information recording portion 202A of the magazine 202 (step S102). In this state, the magnetic head 210 is maintained in contact with said information recording portion 202A with a suitable light pressure, owing to the elastic force of the plate spring 211.

After sending the signal to the magnet control circuit 253, the CPU subsequently sends a signal to the information record/detecting device 252 thereby causing, during the loading of the film magazine 202 together with the holder member 204, the detecting unit to detect whether the information recording portion already contains a used signal or information on the number of used frames (step S103). The obtained result is stored in the CPU.

When the holder member 204 is advanced to the left-end loaded position shown in FIG. 14, the first limit switch Sw3 is closed, and, in response to a signal therefrom, the CPU sends a signal to the motor control circuit 251, thereby stopping the motor M and completing the magazine loading (step S104).

Immediately after the motor stopping signal to the motor control circuit 251, the CPU sends a signal to the magnet control circuit 253, thereby deactivating the electromagnet Mg, whereby the armature 215 is released from the electromagnet Mg. Thus the lever 212 rotates anticlockwise by the biasing force of the tension spring 214, thus separating the magnetic head 210 from the information recording portion 202A (step S105).

Then, in response to the closing of the rear cover 203 (step S106), the rear cover switch Sw1 is opened to send a rear cover signal to the CPU. Thus, based on the signal detected and stored in the step S103, the CPU discriminates whether the loaded magazine 202 is unused or not (step S107). The magazine 202 is identified as unused, if the information recording portion 202a does not contain the used signal or the signal indicating the number of used frames.

If the step S107 identifies the magazine 202 as unused, based on the information detected in the step S103, the CPU sends a signal to the automatic wind/rewinding device 254 to advance the film by a predetermined amount, and interrupts the film winding (step S108) until the shutter release button is depressed.

Then, there is discriminated whether said button has been depressed (step S109), and, if depressed, a predetermined photographing process is executed (step S110). Upon completion of said photographing process, the film winding is started by an instruction from the CPU (step S111), and there is discriminated whether the film has been advanced by a frame, based on the output signal of the film movement detecting device 256 (step S112). After the film advancement of a frame, the number of used frames is shown on the display device 255 (step S113), and the film advancement is terminated (step S114). Then the sequence returns to the step S109 for awaiting the next shutter releasing operation.

If the amount of film advancement does not reach a frame in the step S112, the film advancement is still in progress or is no longer possible because all the frames of the film have been wound. Thus a next step discriminates whether all the frames of the film have been advanced, based on the signal from the film movement detecting device 256 (step S115), and the sequence returns to the step S112 if certain frames are still left. On the other hand, if all the frames have been advanced, the film winding operation is terminated (step S116), and the CPU stores a fact that all the frames of the film has been used (step S117).

On the other hand, when the step S109 identifies that the shutter release button has not been depressed, there is discriminated whether the rewinding instructing button 258, for rewinding the film before the photographing of all the frames, has been depressed (step S118), and, if not depressed, the sequence returns to the step S109 to await the actuation of the shutter release button. In case of such intermediate rewinding, the number of frames shown on the display unit 255 in this state is stored in the CPU (step S119).

Upon completion of the memory operation in the step S117 or S119, the CPU sends an instruction to the automatic wind/rewinding device 254 to rewind the film (step S120). The film rewinding operation is continued to the completion, namely until a signal is produced from the film end detecting device 257 (step S121). Upon completion of the film rewinding, a rear cover open signal flashes on the display 255, thereby requesting the user to open the rear cover (step S140), and the sequence awaits the opening of the rear cover 203 (step S141). In response to the opening of the rear 203, the rear cover switch Sw1 is closed, whereby the electromagnet Mg is energized to bring the magnetic head 201 into contact with the information recording portion 202A of the magazine 202 (step S123).

In succession to the energization of the electromagnet Mg, the motor M is activated to initiate the unloading of the magazine (to right in FIG. 14) together with the holder member 204 (step S124). In response the first limit switch Sw3 is closed, and the information of use, indicating that all the frames have been used or indicating the number of frames used, stored in the step S117 or S119, is recorded by the magnetic head 210 onto the information recording portion 202A during the movement of the magazine 202 (step S125).

When the second limit switch Sw4 is opened by the movement of the magazine 202 together with the holder member 204, the motor M is stopped and the unloading of the magazine is completed (step S126). In response to the opening of said second limit switch Sw4, the electromagnet Mg is again energized to attract the armature 215 against the biasing force of the tension spring 214, thereby separating the magnetic head 210 from the information recording portion 202A (step S127). Then the engaging member 205 is rotated clockwise against the biasing force of the click spring 206, thereby disengaging the hook portion 205B from the right-hand rim of the magazine 202, and said magazine 202 is taken out from the magazine chamber 201A (step S128). The magazine switch Sw2 is closed by the clockwise rotation of the engaging member 205. In this manner the sequence from the magazine loading to the taking out is completed.

On the other hand, if the step S107 identifies that the loaded magazine 202 is not unused, there is then discriminated, according to the information already recorded in the information recording portion 202A, whether the magazine is used on all the frames or partially used and rewound (step S129), and, in case of a partially used magazine, the film is advanced by a number of frames which is larger, by one, than the number of used frames recorded in the information recording portion 202A (step S130). Then the sequence proceeds to the step S109.

On the other hand, if the step S129 identifies an all used magazine, a rear cover opening signal flashes on the display unit 255 to request the opening of the rear cover 203 (step S131), and the sequence then awaits said opening (step S132). When the rear cover 203 is opened, the electromagnet Mg is not energized, and the motor M is activated in response to the opening of the rear cover switch Sw1, thereby starting the unloading of the magazine 202 (step S133). In this case the unloading operation is conducted without the recording of the information of use on the information recording portion 202A, and the motor M is stopped in response to the opening of the second limit switch Sw4 whereby the unloading of the magazine is completed (step S134). Then the sequence proceeds to the step S128 for taking out the magazine.

If the magazine switch Sw2 is opened with a finger after the removal of the magazine 202 in a state shown in FIG. 15, the holder member 204 is moved to left by the motor M as shown in FIG. 14. Then, a repeated actuation of the magazine switch Sw2 causes the reverse rotation of the motor M, whereby the holder member 204 is pushed to right, thus enabling the loading of a magazine 202 in the holder member 204.

The drop-in loading camera of the above-explained third embodiment can record and reproduce various information in encoded form, as the magazine is supported by a magazine holder and is loaded into or unloaded from the magazine chamber with a constant speed. The recording of the number of used frames enables the film rewinding on the way to be advanced according to the number of used frames when said magazine is re-loaded in the camera, so that the photographing operation from a next new frame of the film is performed, thus avoiding the waste of the film.

The magnetic head, is so constructed as to record or reproduce information in contact with the information recording portion during the movement of the magazine holder but to be separated therefrom while the magazine holder is stopped, and is therefore prevented from the danger of damage at the insertion or taking out of the magazine.

In the third embodiment, the information recording portion 202A of the magazine records the information whether the frames of the film are all employed, partially used or unused, but it may be used also for recording other identifying information, such as:

(1) information indicating that the photographing has been effected with a selected sensitivity other than the sensitivity specific to the film;

(2) information indicating the date of magazine loading into the camera or unloading thereof;

(3) information identifying the photographer or the like; and (4) information indicating the presence of any frame, and the position of said frames, for which the range of trimming is designated, in case of a camera for recording trimming information outside a film frame simultaneously with the photographing of said frame, in order to enable automatic trimming at the film development and printing, as disclosed in the Japanese Laid-Open Patent No. 54-26721, and U.S. Pat. Nos. 4,678,299 and 4,678,300.

In the case (1), such other sensitivity selected on the camera can be identified from the film sensitivity data among so-called DX data marked on the magazine, and can be recorded on the recording portion 202A.

In the case (2), the data of magazine loading or unloading, stored in the CPU, can be recorded in said recording portion 202A.

In the case (3), the information to be recorded is selected in advance and is recorded in the recording portion 202A.

In the case (4), the photographing operation with the designation of trimming area is stored in the CPU and can be recorded in the recording portion 202A. It is also possible to record the number and positions of the frames incorporating the trimming area. The recording portion 202A is not limited to a magnetic recording medium, but can also be composed of a semiconductor memory such as an EPROM.

As explained in the foregoing, the camera of the present invention is provided with recording means for recording at least the information of use of a film magazine in a period from the loading thereof to the unloading, and detecting means for detecting said information, whereby the film magazine can be identified as to whether said magazine is already used or not, and the photographing operation is disabled if an already used magazine is loaded in the camera, so that the possibility of erroneous double exposures can be securely prevented.

What is claimed is:

1. A camera in which can be inserted film unit having a film, a container for accommodating said film and an information recording part capable of recording information therein, comprising:

a film transporting device which performs a first transporting operation by which an unexposed frame of said film in said container is electrically transported outside said container to bring said unexposed frame to an exposure position, and a second transporting operation by which said film transported outside said container by said first transporting operation is electrically transported back into said container;

an information recording portion which records in said information recording part information for discrimination between exposed and unexposed frames; and an information detecting portion to detect said information in said information recording part, wherein when said film unit is re-inserted in said camera with unexposed frames remaining, said information detecting portion detects said information and said film transporting device performs said first transporting operation according to said information detected by said information detecting portion to bring an unexposed frame to be next exposed to said exposure position.

2. A camera according to claim 1, wherein said camera further comprises a prevention portion, responsive to said information detecting portion, to prevent re-exposure of frames which have been exposed.

3. A camera according to claim 2, wherein said prevention portion prevents re-exposure of said exposed frames by preventing said first transporting operation when said information indicates that all frames of said film have been exposed.

4. A camera according to claim 1, wherein said information recording part is provided on said container.

5. A device which is capable of loading a film unit having film, a container for accommodating said film, and an information recording part capable of recording information, and which is provided with a film transporter capable of electrically feeding said film out from said container, and then electrically feeding the film fed outside said container back into said container, comprising:

an information detector which detects discrimination information recorded on said information recording part, said discrimination information including information for discriminating between an exposed frame and an unexposed frame of said film; and a feeding controller which is electrically connected to said information detector, and which controls said film transporter, based on said discrimination information, such that an exposed frame of said film is not brought to an exposure position for further exposure.

6. A device according to claim 5, wherein said information recording part is provided on said container.

7. A device according to claim 5, and which is constituted by a camera.

8. A device according to claim 5, including a prohibition device which prohibits a re-exposure of said exposed frame of said film by prohibiting an operation of feeding said film from within said container to outside said container by said film transporter.

9. A device according to claim 5, further comprising:

a recording device which records said discrimination information on said information recording part.

10. A device according to claim 9, wherein said recording device performs said recording operation after said film is rewound from outside said container into said container by said film transporter.

11. A device according to claim 5, wherein said detector performs said detection operation before an operation of said film transporter.

12. A device according to claim 5, wherein said controller controls said film transporter, based on said discrimination information, in such a manner that an unexposed frame of said film is brought to an exposure position for a next exposure operation.

13. A device capable of loading a film unit having a film, a container for accommodating said film, and an information recording part capable of recording information, and which is provided with a film transporter capable of electrically transporting said film, said loaded film unit being unloadable after a rewind operation in which film fed outside said container is fed by said film transporter back inside said container, comprising:

a recording device which records, on said information recording part, discrimination information for discriminating between an exposed frame and an unexposed frame of said film.

14. A device according to claim 13, wherein said discrimination information is information which indicates an unexposed frame to be next exposed.

15. A device according to claim 13, wherein said discrimination information is information which indicates an exposed frame of said film.

16. A device according to claim 13, and which is constituted by a camera.

17. A device according to claim 13, wherein said recording device performs said recording operation in response to said rewinding operation of said film transporter.

18. A device according to claim 17, wherein said recording device performs said recording operation after said film outside said container is fed back into said container.

19. A device according to claim 13, wherein said information recording part is provided on said container.

20. A device which is capable of loading a film unit having a container accommodating film to be fed outside said container and rewound back into said container, said film unit also having a rewritable magnetic information recording part, said device comprising:

a film transporter which is capable of electrically feeding said film out from said container, and then electrically rewinding the film fed outside said container back into said container;

a detector which detects magnetic information of said magnetic information recording part; and a controller which is electrically connected to said film transporter and said detector, and which controls said film transporter based on said magnetic information.

21. A device according to claim 20, further comprising:

a recorder which records information on an operation of said device onto said magnetic information recording part.

22. A device according to claim 20, and which is constituted by a camera.

23. A device according to claim 20, wherein said magnetic information recording part is provided on said container.

24. A device according to claim 20, wherein said magnetic information distinguishes whether each frame of said film has been exposed or is unexposed.

25. A device which is capable of loading a film unit having a container accommodating film to be fed outside said container and rewound into said container, said film unit also having a rewritable magnetic information recording part, said device comprising:

a film transporter which is capable of electrically feeding said film out from said container, and then electrically rewinding the film fed outside said container back into said container; and a recorder which is electrically connected to said film transporter, and which records information on an operation of said device onto said magnetic information recording part.

26. A device according to claim 25, wherein said recorder performs a recording operation after said film is fed outside said container by said film transporter.

27. A device according to claim 25, and which is constituted by a camera.

28. A device according to claim 27, wherein said information is information on an operation of said camera, and which distinguishes whether each frame of said film has been exposed or is unexposed.

29. A device according to claim 25, wherein said magnetic information recording part is provided on said container.

30. A device which is capable of loading a film unit having a container accommodating film to be fed outside said container and rewound back into said container, said film unit also having a changeable-state information part, said device comprising:

a detector which detects a state of said information part to generate a detection signal;

a film transporter which electrically feeds said film out from said container, and then electrically rewinds the film fed outside said container back into said container; and a controller which is electrically connected to said film transporter and said detector, and which controls said film transporter based on said detection signal.

31. A device according to claim 30, wherein said information part is supported by said container.

32. A device according to claim 31, further comprising:
an information part driver which electrically drives said information part.

33. A device according to claim 32, wherein said detector detects a state of said information part when said information part driver drives said information part.

34. A device according to claim 31, wherein said detector detects a state of said information part before said film is fed outside said container.

35. A device according to claim 31, further comprising:
an information setter which electrically drives said information part to set said information part to a predetermined state.

36. A device according to claim 35, wherein said information setter sets said information part in said predetermined state after the film fed outside said container is rewound back into said container by said film transporter.

37. A device according to claim 35, wherein said device subjects film fed outside said container by said film transporter to light, and wherein said controller permits or inhibits feeding of said film out from said container by said film transporter based on said detection signal.

38. A device according to claim 37, which is constituted by a camera, and wherein said information setter sets said information part to a state where said film transporter is inhibited from feeding said film out from said container when said film is rewound back into said container after all frames of said film are exposed.

39. A device according to claim 37, which is constituted by a camera, and wherein said information setter sets said information part to a state where said film transporter is permitted to feed said film out from said container when said film is rewound into said container with a frame that is unexposed.

40. A device according to claim 30, wherein said information part is set to a predetermined state by being changed in magnetic state.

41. A device which is capable of loading a film unit having a container accommodating film to be fed outside said container and rewound back into said container, said film unit also having a changeable-state information part, said device comprising:
a film transporter which electrically feeds said film out from said container, and then electrically rewinds the film fed outside said container back into said container; and
an information setter which electrically drives said information part to set said information part to a predetermined state.

42. A device according to claim 41, wherein said information setter sets said information part to said predetermined state after the film fed outside said container is rewound back into said container by said film transporter.

43. A device according to claim 41, wherein said device subjects film fed outside said container by said film transporter to light.

44. A device according to claim 43, and which is constituted by a camera.

45. A device according to claim 41, wherein said information part is set to said predetermined state by being changed in magnetic state.

46. A method of operating a camera in which can be inserted a film unit having film, a container for accommodating said film, and an information recording part capable of recording information therein for discrimination between exposed and unexposed frames of said film, said camera having a film transporting device which performs a first transporting operation by which an unexposed frame of said film in said container is electrically transported outside said container to bring said unexposed frame to an exposure position, and a second transporting operation by which said film transported outside said container by said first transporting operation is electrically transported back into said container, said method comprising:
detecting information in said information recording part; and
controlling said film transporter based on a result of said detecting.

47. A method according to claim 46, wherein said controlling includes, when a result of said detecting indicates that said film unit is re-inserted in said camera with unexposed frames remaining, causing said film transporting device to perform said first transporting operation to bring an unexposed frame to be next exposed to said exposure position.

48. A method according to claim 46, wherein said controlling includes controlling said film transporter so as to prevent re-exposure of frames which have been exposed.

49. A method according to claim 48, wherein said controlling includes preventing said first transporting operation when said information indicates that all frames of said film have been exposed.

50. A method according to claim 46, wherein said information recording part is provided on said container.

51. A method of operating a device capable of loading a film unit having film, a container for accommodating said film, and an information recording part capable of recording information, said device being provided with a film transporter capable of electrically feeding said film out from said container and then electrically feeding the film fed outside said container back into said container, said method comprising:
detecting discrimination information on said information recording part, said discrimination information including information for discriminating between an exposed frame and an unexposed frame of said film; and
controlling said film transporter, based on said discrimination information, such that an exposed frame of said film is not brought to an exposure position for further exposure.

52. A method according to claim 51, wherein said information recording part is provided on said container.

53. A method according to claim 51, wherein said device is a camera.

54. A method according to claim 51, wherein said controlling includes prohibiting an operation of feeding said film from within said container to outside said container by said film transporter.

55. A method according to claim 51, further comprising:
recording additional discrimination information on said information recording part.

56. A method according to claim 55, wherein said recording is performed after said film is rewound from outside said container into said container by said film transporter.

57. A method according to claim 51, wherein said detecting is performed before an operation of said film transporter.

58. A method according to claim 51, wherein said controlling includes controlling said film transporter, based on said discrimination information, in such a manner that an unexposed frame of said film is brought to an exposure position for a next exposure operation.

59. A method of operating a device capable of loading a film unit having film, a container for accommodating said film, and an information recording part capable of recording information, said device being provided with a film transporter capable of electrically transporting said film, and said film unit being unloadable after a rewind operation in which film fed outside said container is fed by said film transporter back inside said container, said method comprising:

recording, on said information recording part, discrimination information for discriminating between an exposed frame and an unexposed frame of said film.

60. A method according to claim 59, wherein said discrimination information is information which indicates an unexposed frame to be next exposed.

61. A method according to claim 59, wherein said discrimination information is information which indicates an exposed frame of said film.

62. A method according to claim 59, wherein said device is a camera.

63. A method according to claim 59, wherein said recording is performed in response to said rewind operation of said film transporter.

64. A method according to claim 63, wherein said recording is performed after said film outside said container is fed back into said container.

65. A method according to claim 59, wherein said information recording part is provided on said container.

66. A method of operating a device capable of loading a film unit having a container accommodating film to be fed outside said container and rewound back into said container, said film unit also having a rewritable magnetic information recording part, and said device being provided with a film transporter that is capable of electrically feeding said film out from said container and then electrically rewinding the film fed outside said container back into said container, said method comprising:

detecting magnetic information of said magnetic information recording part; and controlling said film transporter based on said magnetic information.

67. A method according to claim 66, further comprising:

recording information on an operation of said device onto said magnetic information recording part.

68. A method according to claim 66, wherein said device is a camera.

69. A method according to claim 66, wherein said magnetic information recording part is provided on said container.

70. A method according to claim 66, wherein said magnetic information distinguishes whether each frame of said film has been exposed or is unexposed.

71. A method of operating a device capable of loading a film unit having a container accommodating film to be fed outside said container and rewound into said container, said film unit also having a rewritable magnetic information recording part, and said device being provided with a film transporter which is capable of electrically feeding said film out from said container and then electrically rewinding the film fed outside said container back into said container, said method comprising:

recording information on an operation of said device onto said magnetic information recording part.

72. A method according to claim 71, wherein said recording is performed after said film is fed outside said container by said film transporter.

73. A method according to claim 71, wherein said device is a camera.

74. A method according to claim 73, wherein said information is information on an operation of said camera, and which distinguishes whether each frame of said film has been exposed or is unexposed.

75. A method according to claim 71, wherein said magnetic information recording part is provided on said container.

76. A method of operating a device capable of loading a film unit having a container accommodating film to be fed outside said container and rewound back into said container, said film unit also having a changeable-state information part, and said device being provided with a film transporter which electrically feeds said film out from said container and then electrically rewinds the film fed outside said container back into said container, said method comprising:

detecting a state of said information part; and controlling said film transporter based on a result of said detecting.

77. A method according to claim 76, wherein said information part is supported by said container.

78. A method according to claim 77, further comprising:

electrically driving said information part.

79. A method according to claim 78, wherein the state of said information part is detected when said information part is driven.

80. A method according to claim 77, wherein the state of said information part is detected before said film is fed outside said container.

81. A method according to claim 77, further comprising:

electrically driving said information part to set said information part to a predetermined state.

82. A method according to claim 81, wherein said information part is set to said predetermined state after the film fed outside said container is rewound back into said container by said film transporter.

83. A method according to claim 81, wherein said device subjects film fed outside said container by said film transporter to light, and wherein said controlling includes permitting or inhibiting feeding of said film out from said container by said film transporter based on said detecting result.

84. A method according to claim 83, wherein said device is a camera, and wherein said information part is set to a state where said film transporter is inhibited from feeding said film out from said container when said film is rewound back into said container after all frames of said film are exposed.

85. A method according to claim 83, wherein said device is a camera, and wherein said information part is set to a state where said film transporter is permitted to feed said film out from said container when said film is rewound into said container with a frame that is unexposed.

86. A method according to claim 76, wherein said information part is settable to a predetermined state by being changed in magnetic state.

87. A method of operating a device capable of loading a film unit having a container accommodating film to be fed outside said container and rewound back into said container, said film unit also having a changeable-state information part, and said device being provided with a film transporter which electrically feeds said film out from said container and then electrically rewinds the film fed outside said container back into said container, said method comprising:

electrically driving said information part to set said information part to a predetermined state.

88. A method according to claim 87, wherein said information part is set to said predetermined state after the film fed outside said container is rewound back into said container by said film transporter.

89. A method according to claim 87, wherein said device subjects film fed outside said container by said film transporter to light.

90. A method according to claim 89, wherein said device is a camera.

91. A method according to claim 87, wherein said information part is set to said predetermined state by being changed in magnetic state.

* * * * *